United States Patent
Arndt et al.

(10) Patent No.: US 10,667,645 B2
(45) Date of Patent: Jun. 2, 2020

(54) MILK-FROTHING DEVICE, DRINKS PREPARER COMPRISING SAME, AND METHOD FOR FROTHING MILK

(71) Applicant: WMF Group GmbH, Geislingen/Steige (DE)

(72) Inventors: Peter Arndt, Blaustein (DE); Sander Dollner, Neu-Ulm (DE); Jochen Gussmann, Schwäbisch Gmünd (DE); Armin Startz, Weidenstetten (DE); Thobias Kuchler, Ulm (DE)

(73) Assignee: WMF GROUP GMBH, Geislingen/Steige (DE)

( * ) Notice: Subject to any disclaimer, the term of this patent is extended or adjusted under 35 U.S.C. 154(b) by 226 days.

(21) Appl. No.: 15/556,991

(22) PCT Filed: Mar. 7, 2016

(86) PCT No.: PCT/EP2016/054736
§ 371 (c)(1),
(2) Date: Sep. 8, 2017

(87) PCT Pub. No.: WO2016/142318
PCT Pub. Date: Sep. 15, 2016

(65) Prior Publication Data
US 2018/0055277 A1    Mar. 1, 2018

(30) Foreign Application Priority Data
Mar. 10, 2015 (DE) .................. 10 2015 204 278

(51) Int. Cl.
*A47J 31/44* (2006.01)
*A47J 31/40* (2006.01)
*A23P 30/40* (2016.01)

(52) U.S. Cl.
CPC ........... *A47J 31/4485* (2013.01); *A23P 30/40* (2016.08); *A47J 31/40* (2013.01)

(58) Field of Classification Search
CPC ......... A47J 31/40; A47J 31/4485; A23P 30/40
See application file for complete search history.

(56) References Cited

U.S. PATENT DOCUMENTS

| | | | |
|---|---|---|---|
| 5,611,262 A * | 3/1997 | Rizzuto | A47J 31/4485 99/290 |
| 6,082,120 A | 7/2000 | Hoffmann et al. | |

(Continued)

FOREIGN PATENT DOCUMENTS

| | | |
|---|---|---|
| CA | 2 894 392 A1 | 6/2014 |
| CN | 105960186 A | 9/2016 |

(Continued)

OTHER PUBLICATIONS

English translation of Chinese Office Action, issued in CN Application No. 201680015069.9, dated Dec. 29, 2018, pp. 1-16, Chinese Patent Office, Beijing, China.

(Continued)

*Primary Examiner* — Anthony J Weier
(74) *Attorney, Agent, or Firm* — Brinks Gilson & Lione

(57) ABSTRACT

A milk-frothing device may be provided that comprises a mixing chamber which is constructed such that, when the milk flows through the mixing chamber, shear forces act on the milk and lead to mechanical lysis of the proteins contained in the milk and hence effect improved frothing-up of the milk. A drinks preparer may be provided that includes this milk-frothing device. A method may be provided for frothing-up of milk using this milk-frothing device.

18 Claims, 2 Drawing Sheets

(56) References Cited

U.S. PATENT DOCUMENTS

| | | | |
|---|---|---|---|
| 8,707,856 B2* | 4/2014 | Mahlich | A47J 31/4485 99/280 |
| 2005/0259508 A1* | 11/2005 | Rohde | A47J 31/4489 366/102 |
| 2009/0107342 A1* | 4/2009 | Piscaer | A47J 31/401 99/323.1 |
| 2010/0075007 A1 | 3/2010 | Schindler et al. | |
| 2016/0367071 A1 | 12/2016 | Dollner et al. | |

FOREIGN PATENT DOCUMENTS

| | | |
|---|---|---|
| DE | 39 18 268 C1 | 7/1990 |
| DE | 10 2013 224 786 B3 | 12/2013 |
| EP | 2 120 656 B1 | 1/2008 |
| EP | 2 294 952 B1 | 12/2011 |
| EP | 2 570 060 A1 | 3/2013 |
| JP | S52-030489 U1 | 8/1950 |
| JP | 2010273744 A2 | 12/2010 |
| JP | 5423146 B2 | 2/2014 |
| WO | WO 90/10411 | 9/1990 |
| WO | WO 2014/096183 A1 | 6/2014 |
| WO | WO 2015/082391 A1 | 6/2015 |

OTHER PUBLICATIONS

International Search Report with English translation, dated Jun. 29, 2016, pp. 1-5, Issued in International Application No. PCT/EP2016/054736, European Patent Office, Rijswijk, Netherlands.

English translation of Japanese Office Action, issued in JP Application No. 2017-547159, dated Mar. 5, 2019, pp. 1-6, Japanese Patent Office, Tokyo, JP.

* cited by examiner

MILK-FROTHING DEVICE, DRINKS PREPARER COMPRISING SAME, AND METHOD FOR FROTHING MILK

CROSS-REFERENCE TO RELATED APPLICATIONS

This application is a 371 nationalization of international patent application PCT/EP2016/054736 filed Mar. 7, 2016, the entire contents of which are hereby incorporated by reference, which in turn claims priority under 35 USC § 119 to German patent application DE 10 2015 204 278.2 filed on Mar. 10, 2015.

DETAILED DESCRIPTION

Figure 1:
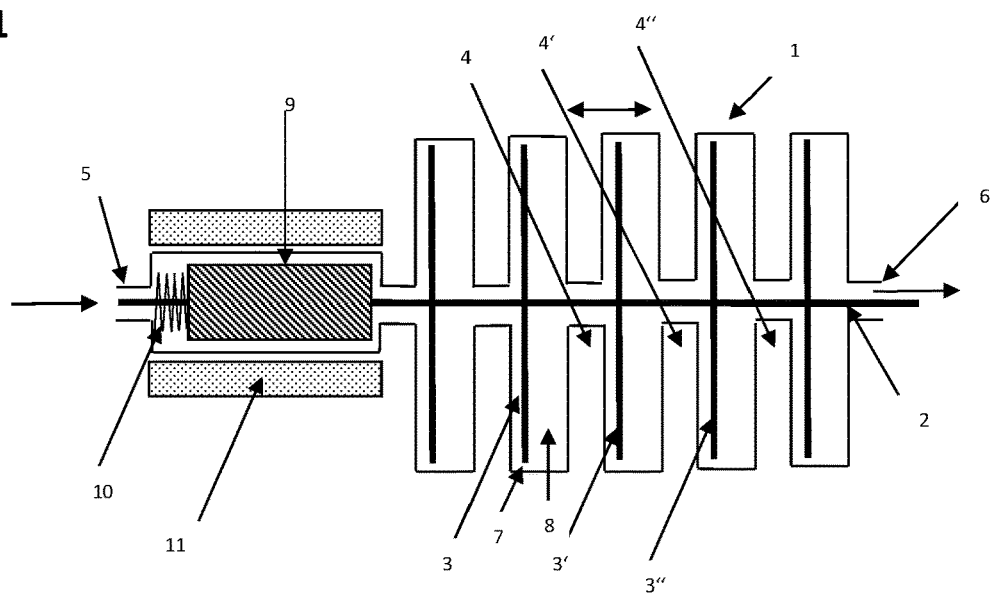
FIG. 1 shows a first embodiment according to the invention of the milk-frothing device.

The present invention relates to a milk-frothing device having a mixing chamber which is constructed such that, when the milk flows through the mixing chamber, shear forces act on the milk and lead to mechanical lysis of the proteins contained in the milk and hence effect improved frothing-up of the milk. The invention also relates to a drinks preparer having this milk-frothing device and a method for frothing-up of milk using this milk-frothing device.

Modern coffee machines which also dispense milk or milk froth or even mixed drinks, can also dispense cold milk or cold milk froth. In order to dispense milk or milk froth, alternatively cold or heated, complex systems are used: for example, there are devices for circumventing the heater (EP 2 120 656 B1) or completely separated (double) paths for producing and dispensing cold or warm products (EP 2 294 952 B1).

The high complexity on the system-side is thereby disadvantageous. This also results from the fact that, for frothing-up warm milk, a substantially higher energy input is required for producing the same microporous and homogeneous froth quality than in the case of cold milk because of the significantly different viscosity. A great disadvantage of the known systems is in particular the low flexibility since often high operating pressures are required (due to very small apertures in the pipe lines). This leads to the fact that components, such as pumps, through-flow heaters etc., can be used only within a very narrow range and have a mutual effect on each other. The result is hence correspondingly limited in variability.

Starting from this state of the art, it is the object of the present invention to provide a milk-frothing device which enables the greatest possible flexibility with respect to froth consistencies. At the same time, the system is intended to have a simple, but simultaneously less unreliable, construction so that the froth production is as far as possible independent of variations in parameters, such as air quantity, air pressure, milk quantity, milk pressure or temperatures.

According to the invention, a milk-frothing device having a mixing chamber is provided, the mixing chamber having at least one inlet for milk and air and/or steam and also at least one outlet for the milk froth. In the mixing chamber, a radially or axially moveable shaft is disposed in addition and the mixing chamber has, between inlet and outlet, a plurality of alternately disposed shear elements which enable a meandering flow of the milk from inlet to outlet. The mixing chamber thereby has, in the flow region of the milk, restrictions which represent a flow resistance for the through-flowing milk so that, when the milk flows through the restriction, shear forces act on the milk due to the restriction and lead to mechanical lysis of the proteins contained in the milk.

Both air alone and air mixed with steam in the form of an air-steam mixture can be supplied to the mixing chamber. The supply of air alone is chosen in the cases in which a cold milk froth is intended to be produced. If in contrast a warm milk froth is intended to be produced, then an air-steam mixture is added. Basically, it is also possible that both the milk and the air or the air-steam mixture is supplied to the mixing chamber via a single inlet.

According to the invention, the mixing chamber now has shear elements by means of which a multiple shearing effect is transmitted to the milk flowing through the mixing chamber. This is effected by restrictions in the flow region by means of which a flow resistance is produced and leads to a pressure increase in front of the restriction and a sudden pressure decrease in the milk immediately behind the restriction. As a result of this sudden pressure decrease, such strong shear forces arise that the result is a mechanical cell lysis of the proteins contained in the milk. It is effected by this cell lysis that the milk can be frothed-up better.

The mixing chamber can have both a cylindrical or conical construction. In the case of a conical construction, it is preferred that the diameter of the mixing chamber decreases from the inlet to the outlet. By reducing the diameter, the energy input can be reduced towards the end, which leads to settling of the froth, as a result of which the homogenisation of the milk froth can be improved.

A preferred embodiment of the milk-frothing device provides that the at least one inlet for milk and air or air-steam mixture is disposed in the centre of the mixing chamber in the region of the shaft. In this case, the shear elements are disposed such that the milk entering through the inlet or the mixtures of milk and air or air-steam mixture is conveyed alternately from the chamber centre to the chamber wall and subsequently from the chamber wall to the chamber centre. This meandering flow path can be repeated several times, the number of meanders being limited merely by the dimensioning of the mixing chamber.

A further embodiment according to the invention provides that the at least one inlet for milk, air or air-steam mixture is disposed in the region of the chamber wall. In this case, the shear elements are disposed such that the milk, air or air-steam mixture is conveyed alternately from the chamber wall to the chamber centre and subsequently from the chamber centre to the chamber wall. Here also, a meandering flow is then produced.

A further preferred embodiment provides that shear elements are disposed on the at least one shaft and are at a spacing relative to the chamber wall, as a result of which formation of wall-side openings is produced, which openings, in comparison with the remaining flow region, i.e. the flow regions between adjacent shear elements, are dimensioned such that these wall-side openings represent restrictions. In addition, also shear elements are disposed on the chamber wall, as a result of which formation of shaft-side openings is produced, which openings, in comparison with the remaining flow region, i.e. the flow regions between adjacent shear elements, are dimensioned such that these wall-side openings represent restrictions. The flow resistance caused by the restrictions effects a pressure increase in front of the restriction and, directly after the restriction, a sudden pressure decrease, as a result of which particularly strong shear forces act on the milk.

A preferred construction of the mixing chamber provides that the shear elements in the mixing chamber are disposed alternately on the mixing chamber wall and the shear elements which are adjacent in the inlet- and outlet direction respectively are disposed on the shaft. This leads to a meandering flow of the milk.

The shaft disposed in the mixing chamber can be rotated by means of a rotor drive, in a preferred variant. The speed of rotation of the rotor is thereby preferably between 500 1/min and 7,000 1/min, particularly preferably between 2,000 1/min and 4,000 1/min.

It is likewise possible that a plurality of rotatable shafts, e.g. two shafts, are disposed in the mixing chamber and are rotatable in opposite directions relative to each other. In this case, additional shear forces act on the milk because of the rotation.

A further preferred embodiment provides that the shaft is moveable axially in the direction of the inlets and in the direction of the outlets by means of an axial drive. Preferably, oscillating armature drives are included herein, as are used e.g. in an oscillating armature pump. The shaft is thereby provided on one end with an iron core or permanent magnet (armature) and a spring. In addition a coil which is supplied with alternating voltage and produces an oscillating magnetic field is used. In the case of two separate coils, a spring can be dispensed with. The oscillating armature drive can be integrated both in the mixing chamber so that spring and armature are subjected to a circulating flow of milk. It is likewise possible that the oscillating armature drive is disposed outside the mixing chamber.

The shear elements according to the invention are preferably selected from the group consisting of discs, lamellae and also combinations hereof. The discs can thereby have through-openings in addition, in particular in the form of holes, slots or combinations hereof. These through-openings, relative to the remaining flow region, i.e. the region between adjacent discs, are dimensioned such that the through-openings represent restrictions. These then form a flow resistance for through-flowing milk. When passing through the through-openings, the result is then likewise a sudden pressure decrease behind the through-opening, which is associated with increased shear forces on the through-flowing milk. The through-openings of adjacent discs are hereby preferably disposed offset relative to each other so that milk flowing through the through-opening must be deflected in order to flow through the through-opening in the next disc.

A further preferred embodiment provides that the milk-frothing device is connected to a control unit, with which at least one of the following parameters of the milk-frothing device is/are adjustable:
  the milk quantity supplied to the mixing chamber,
  the air quantity or air-steam mixture quantity supplied to the mixing chamber per unit of time,
  the mixing ratio of air and steam of an air-steam mixture supplied to the dynamic mixing unit,
  the conveying speed for milk, air and/or steam
  the mechanical energy supply for the shaft, in particular speed of rotation of stroke and/or stroke frequency.

Preferably, the milk- and/or milk-frothing temperature can be controlled or regulated via the quantity of steam and/or the temperature of the steam, the energy input being attributable essentially to the condensation of the steam. Alternatively or additionally, it is also possible to provide heating of the mixing chamber and/or a through-flow heater for heating the milk and/or the milk froth. This can also be controlled by the control unit or regulated by the control- and regulating unit.

According to the invention, a drinks preparer is also provided, which has a milk-frothing device, as was described previously. Included in the drinks preparer according to the invention are in particular those for preparing hot drinks.

According to the invention, a method for frothing-up of milk in a mixing chamber having at least one inlet for milk and/or air and/or air-steam mixture and also at least one outlet for the milk froth is provided. In the mixing chamber, a radially or axially moveable shaft is thereby disposed. The milk flows along shear elements disposed in the mixing chamber meandering through the mixing chamber from the inlets to the outlets. Because of the plurality of restrictions in the flow region of the milk, a flow resistance is produced so that, when milk flows through the restrictions, shear forces act on the milk and lead to mechanical lysis of the proteins contained in the milk.

Steam can be supplied to the mixing chamber in order to dispense the mixture (the milk froth) in a warm state. In addition, also mixing of flavourings (e.g. in syrup form) in the mixing chamber is possible or e.g. admixing of coffee or frothing-up of drinking chocolate or similar drinks.

By changing for example the speed of rotation of the rotor drive, the stroke rate of the axial drive of the air quantity (volume flow), the milk quantity (volume flow) and/or steam temperature and/or steam quantity or any combination thereof, the froth consistency can be adjusted, according to the invention, over a wide range, a reaction being able to be made flexibly to influential variables, such as for example the viscosity of the milk due to the milk temperature.

The milk can be supplied to the mixing chamber for example by a pump. The mixing chamber can also be disposed upstream of the pump so that the pump serves for additional froth refinement. Furthermore, the mixing chamber can also be used for refining the froth which is produced by a standard venturi system, as is known to the person skilled in the art. Also heated milk can be supplied to the mixing chamber by a venturi system (heating of the milk by steam without air supply in the venturi system), the already heated milk being able to be frothed up in the mixing chamber by the supply exclusively of air (i.e. without steam). The milk-frothing device can also comprise a through-flow heater for heating the frothed-up milk (i.e. downstream of the mixing chamber). It is also possible to provide such a through-flow heater upstream of the mixing chamber in order to heat the milk already before frothing-up thereof (or before the air supply).

The milk-frothing device according to the invention has several advantages relative to the milk-frothing devices known from the state of the art.

The input-side pressure (compared with aperture systems which require more than 2 bar, partially up to 6 bar) can be comparatively low, i.e. <2 bar (for example 600 to 1,200 mbar). Hence the milk frother according to the invention need not operate at high pressure, it allows therefore a significantly wider variation range with respect to froth consistency and froth quality.

Since the individual parameters of the system (e.g. speed of rotation of the rotor drive of the shaft, stroke rate of the axial drive, supplied air quantity, supplied milk quantity, mixing degree between air and steam) do not in practice mutually influence each other, the milk-frothing device according to the invention has very high flexibility. Precisely also as a result of this flexibility, a homogeneous froth formation is possible with the most varied of froth qualities.

The milk-frothing device according to the invention has a comparatively simple and compact construction with few components. The occurring dead spaces are hereby very small.

The milk-frothing device according to the invention allows simple and efficient cleaning without dismantling, the cleaning being able to be assisted mechanically by moving the shaft. In the case of a rotating shaft, this can be produced for example by changing the direction of rotation.

Because of the low system pressure, seals and closures can be designed such that components can be exchanged without a tool. The milk-frothing device according to the invention is hence particularly maintenance-friendly.

The device according to the invention allows a large range of different conveying powers, a consistent froth quality being possible despite the different conveying power. In particular, also a simple heating function (via the flowed-in steam) is possible by means of the invention, in the case of which the result is condensation of the steam in the circulating flow region around the rotor outer circumference.

The subject according to the invention is intended to be explained in more detail with reference to the subsequent Figures and examples without wishing to apply said subject to the specific embodiments shown here. In this respect, also individual features in the Figures can be combined in any manner with other components of the device according to the invention.

FIG. 1 shows a first embodiment according to the invention of the milk-frothing device.

Figure 2:
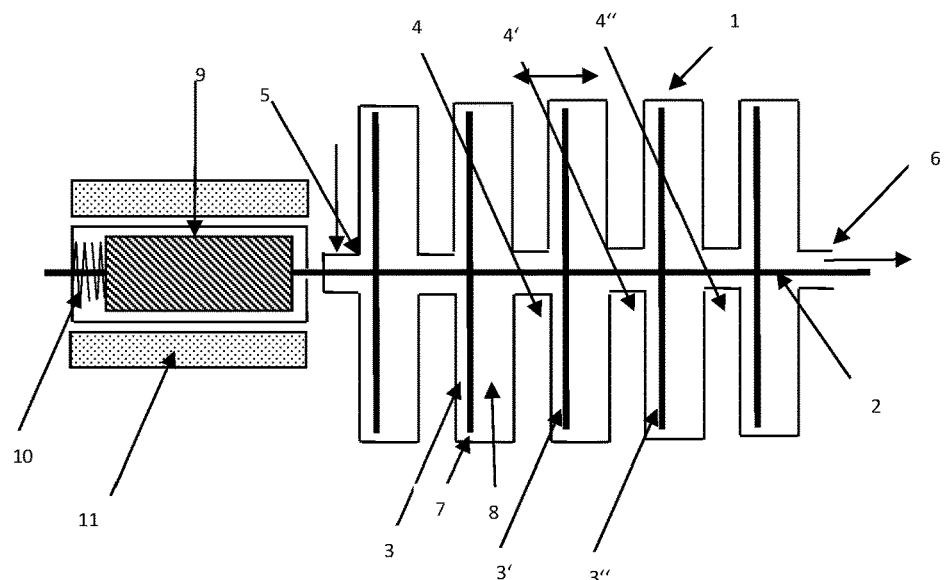
FIG. 2 shows a second embodiment according to the invention of the milk-frothing device.

FIG. 2 shows a second embodiment according to the invention of the milk-frothing device.

Figure 3:
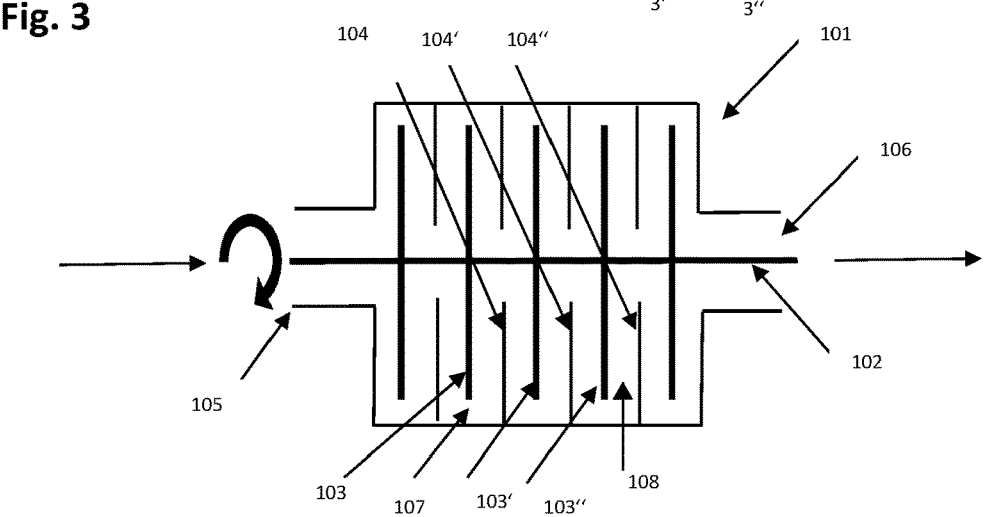
FIG. 3 shows a third embodiment according to the invention of the milk-frothing device.

FIG. 3 shows a third embodiment according to the invention of the milk-frothing device.

Figure 4:
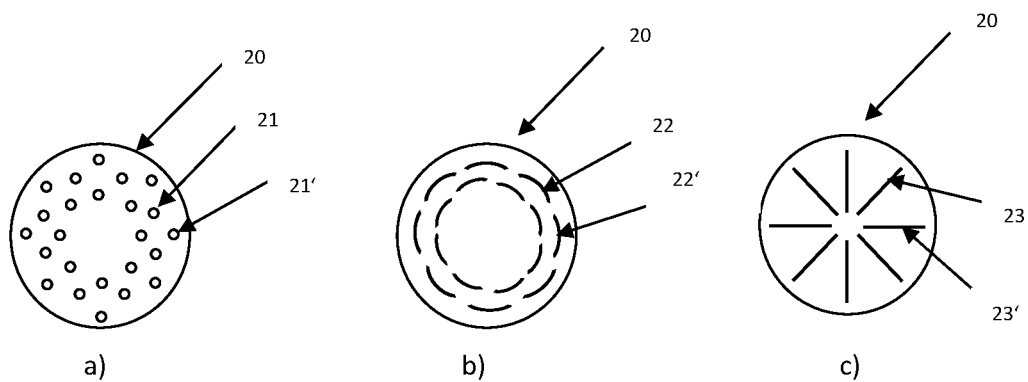
FIG. 4 shows different variants of the shear elements according to the invention.

FIG. 4 shows different variants of the shear elements according to the invention.

Figure 5:
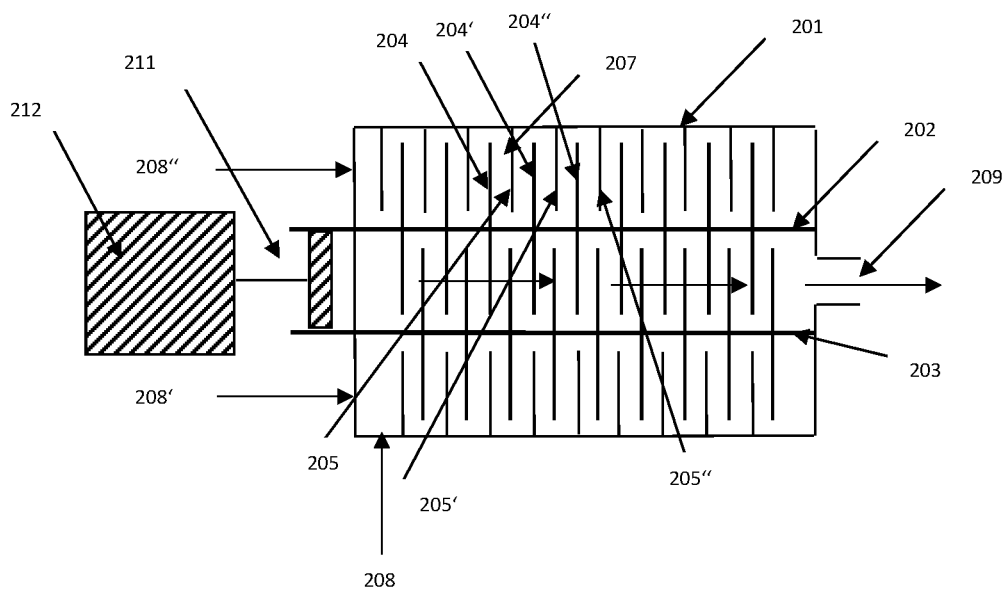
FIG. 5 shows a fourth embodiment according to the invention of the milk-frothing device.

FIG. 5 shows a fourth embodiment according to the invention of the milk-frothing device.

Figure 6:
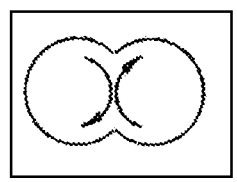
FIG. 6 shows a sectional illustration of the fourth embodiment according to the invention.

FIG. 6 shows a sectional illustration of the fourth embodiment according to the invention.

In FIG. 1, a first embodiment according to the invention is illustrated, which has a mixing chamber 1 in which a shaft 2 with shear elements 3, 3' and 3" is disposed in the centre. Furthermore, shear elements 4, 4' and 4" are likewise disposed on the mixing chamber wall. The shaft 2 extends in the mixing chamber 1 from the inlet 5 to the outlet 6 for the milk, air or steam-air mixture. The shear elements 3, 3' and 3" (in the form of discs) are now at a spacing relative to the mixing chamber wall such that an opening or gap 7 is present between the mixing chamber wall and the shear element, which opening or gap, in comparison with the flow region 8 between the adjacent shear elements 3 and 4, is dimensioned to be significantly smaller and hence represents a restriction. In FIG. 1, this is described only for one shear element, analogously also in the case of other shear elements, corresponding restrictions are present. The flow resistance effected by these restrictions leads to a pressure increase directly in front of the restriction. After passing through the restriction 7, the result then is a sudden pressure decrease in the through-flowing milk, which leads to strong shear forces acting on the milk, which in turn has the effect that frothing-up of the milk is facilitated.

This effect is enhanced in FIG. 1 also by the shaft 2 being moveable by means of a drive in the direction of the inlet 4 and the outlet 5. The drive hereby consists of an armature 9, and also a spring 10. By means of the coil 11 which is supplied with alternating voltage, an oscillating magnetic field is produced. A vibrating movement of the shaft 2 with associated shear elements 3, 3' and 3" in the axial direction results herefrom.

In FIG. 2, a further embodiment according to the invention which corresponds in essential points to the embodiment in FIG. 1 is illustrated. In this respect, reference is made to the relevant description for FIG. 1. The difference from FIG. 1 resides in the fact that the drive device with armature 9 and spring 10 is not integrated in the mixing chamber 1 but rather the mixing chamber 1 and the drive have been separated from each other. The inlet 5 for milk, air or air-steam mixture is disposed here between mixing chamber 1 and drive.

In FIG. 3, a further milk-frothing device according to the invention which consists of a mixing chamber 101 in which a shaft 102 is disposed centrally is illustrated. The shaft 102 has a plurality of shear elements 103, 103' and 103". The shaft 102 is rotated here by a rotary drive, not illustrated. The shaft thereby is situated in the axis of rotation and extends from the inlet 105 to the outlet 106 for milk, air or air-steam mixture. Here also, the shear elements are at a spacing relative to the mixing chamber wall such that the opening 107 has a significantly smaller dimension than the flow regions 108 between adjacent shear elements, i.e. respectively a shear element 103 which is disposed on the shaft 102 and a shear element 104 which is disposed on the wall of the mixing chamber 1.

In FIG. 4, different examples of shear elements 3 according to the invention are illustrated. All three cases concern a disc which can have different forms of through-openings. FIG. 4a concerns a perforated disc 20 with holes 21, 21' etc. A further variant according to FIG. 4b provides that the disc 20 has essentially radially disposed slots 22, 22' etc. According to a third variant, the disc 20 can have slots 23, 23' etc. which are disposed in a star-shape (see FIG. 4c).

In FIG. 5, a further embodiment of the milk-frothing device according to the invention which illustrates a mixing chamber 201 with two shafts 202 and 203 which are disposed offset relative to each other is illustrated. On the shaft 202, a large number of shear elements 204, 204' and 204" is disposed. In the Figure, only a part of the otherwise identical shear elements is described. Analogously to the shaft 202, the second shaft 203 is provided with shear elements which have not been described here. Adjacent to the shear elements 204, 204' and 204" of the first shaft 202, further shear elements 205, 205' and 205" are disposed adjacent to the mixing chamber wall. The mixing chamber can have an inlet 208 disposed at the side of the mixing chamber or have inlets 208' and/or 208" disposed also on the end-side. The outlet 209 is disposed at the other end of the mixing chamber 201. Both shafts 202 and 203 are connected to a drive wheel 210 which is connected via a shaft 211 to a motor 212. As a result of this drive, a rotation of both shafts 21 and 22 in opposite directions is effected. In FIG. 6, a sectional illustration of the milk-frothing device according to FIG. 5 is illustrated, from which the movement of the two shafts in opposite directions can be detected.

The invention claimed is:

1. A milk-frothing device comprising:
a mixing chamber including at least one inlet for milk and air or an air-steam mixture and at least one outlet for milk froth, a chamber wall, and a shaft, the shaft disposed in the mixing chamber and radially or axially moveable, the mixing chamber including, between the at least one inlet and the at least one outlet, a plurality of shear elements configured to effect a meandering flow of the milk from the at least one inlet to the at least one outlet,
wherein each one of the shear elements is disposed on the shaft or on the chamber wall, wherein adjacent ones of the shear elements form a plurality of shear-side openings, and the shear elements that are disposed on the shaft are spaced apart from the chamber wall forming a plurality of wall-side openings, wherein the wall-side openings, in comparison with the shear-side openings, are dimensioned such that the wall-side openings represent a flow resistance for the milk, wherein the wall-side openings represent restrictions, wherein a distance of at least one of the wall-side openings from a tip of a corresponding one of the shear elements to the chamber wall is less than a width of at least one of the shear-side openings,
wherein said restrictions are located in a flow region of the milk and represent a flow resistance for through-flowing milk so that, when the milk flows through the restrictions, shear forces act on the milk and lead to mechanical lysis of the proteins contained in the milk.

2. The milk-frothing device according to claim 1, wherein the at least one inlet is disposed in the chamber centre in the region of the shaft and the shear elements are disposed such that the milk entering through the inlet is conveyed alternately from the chamber centre to the chamber wall and from the chamber wall to the chamber centre.

3. The milk-frothing device according to claim 1, wherein the at least one inlet is disposed in the region of the chamber wall and the shear elements are disposed such that the milk entering through the inlet is conveyed alternately from the chamber wall to the chamber centre and from the chamber centre to the chamber wall.

4. The milk-frothing device according to claim 1, wherein the shear elements in the mixing chamber are disposed alternately and at a spacing relative to each other on the mixing chamber wall and the shaft.

5. The milk-frothing device according to claim 1, wherein the shaft is rotatable by means of a rotor drive.

6. The milk-frothing device according to claim 1, wherein the shaft is moveable axially in the direction of the inlet and in the direction of the outlet by means of an axial drive.

7. The milk-frothing device according to claim 1, wherein the shear elements are selected from a group consisting of discs, lamellae and combinations hereof.

8. The milk-frothing device according to claim 7, wherein the discs have through-openings, which, relative to the remaining flow region of the milk, are dimensioned such that the through-openings represent a flow resistance for through-flowing milk and restrictions.

9. The milk-frothing device according to the claim 8, wherein the through-openings of adjacent discs are disposed offset relative to each other such that through-flowing milk is deflected.

10. The milk-frothing device according to claim 1, wherein the mixing chamber is constructed cylindrically or conically.

11. The milk-frothing device according to claim 1, wherein the milk-frothing device is connected to a control unit with which at least one of the following parameters of the milk-frothing device is/are adjustable:
a milk quantity supplied to the mixing chamber,
a air quantity or air-steam mixture quantity supplied to the mixing chamber per unit of time,
a mixing ratio of air and steam of an air-steam mixture supplied to the mixing chamber,
a conveying speed for milk, air and/or steam; or
a mechanical energy supply for the shaft.

12. A drink preparing device comprising a milk-frothing device according, wherein the milk-frothing device comprises
a mixing chamber including at least one inlet for milk and air or an air-steam mixture and at least one outlet for milk froth and a shaft, the shaft disposed in the mixing chamber and radially or axially moveable, the mixing chamber including, between the at least one inlet and the at least one outlet, a plurality of shear elements configured to effect a meandering flow of the milk from the at least one inlet to the at least one outlet,
wherein the shear elements are disposed on the shaft, and are at a spacing relative to the chamber wall with formation of wall-side openings which, in comparison with the remaining flow region, are dimensioned such that the openings represent a flow resistance for the milk, wherein the wall-side openings represent restrictions,
wherein said restrictions are located in a flow region of the milk and represent a flow resistance for through-flowing milk so that, when the milk flows through the restrictions, shear forces act on the milk and lead to mechanical lysis of the proteins contained in the milk.

13. A method for frothing-up of milk in a mixing chamber, the mixing chamber comprising
a chamber wall,
a shaft and
at least one inlet and
at least one outlet for milk,
the shaft disposed in the mixing chamber and radially or axially moveable,
in which the milk flows along a plurality of shear elements in a meandering flow through the mixing chamber from the inlet to the outlet,
wherein each one of the shear elements is disposed on the shaft or on the chamber wall, wherein adjacent ones of the shear elements form a plurality of shear-side openings, and the shear elements that are disposed on the shaft are spaced apart from the chamber wall forming a plurality of wall-side openings, wherein the wall-side openings, in comparison with the shear-side openings, are dimensioned such that the wall-side openings represent a flow resistance for the milk, wherein the wall-side openings represent restrictions, wherein a distance of at least one of the wall-side openings from a tip of a corresponding one of the shear elements to the chamber wall is less than a width of at least one of the shear-side openings,
wherein a flow resistance is produced by the plurality of restrictions in the flow region of the milk so that, when the milk flows through the restrictions, shear forces act on the milk and lead to mechanical lysis of the proteins contained in the milk.

14. The method according to claim 13, wherein there are used as shear elements discs, lamellae or combinations hereof.

15. The method according to claim 14, wherein the discs have through-openings, which, relative to the remaining flow region of the milk, are dimensioned such that the through-openings represent a flow resistance for through-flowing milk and restrictions.

16. The drink preparing device according to claim 12 comprising an electrically operated coffee machine.

17. The drink preparing device according to claim 12, wherein the drink preparing device is a hot drink preparing device.

18. The milk-frothing device according to claim 1, wherein a mechanical energy supply for the shaft comprises a speed of rotation of stroke and/or a stroke frequency.

\* \* \* \* \*